United States Patent [19]

Holman

[11] 4,255,477
[45] Mar. 10, 1981

[54] ARTIFICIAL BOARD OF LUMBER

[76] Inventor: John A. Holman, 426 Sayre St., Anderson, S.C. 29624

[21] Appl. No.: 954,888

[22] Filed: Oct. 24, 1978

Related U.S. Application Data

[63] Continuation-in-part of Ser. No. 795,203, May 9, 1977, Pat. No. 4,122,236.

[51] Int. Cl.³ .............................................. B32B 9/04
[52] U.S. Cl. .................... 428/106; 428/107; 428/108; 428/110; 428/453; 428/528; 428/529; 428/535; 428/537; 428/541
[58] Field of Search ............. 428/537, 528, 529, 535, 428/453, 538, 539, 541, 107, 106, 108, 110; 264/45, 128; 156/62, 2, 288, 289

[56] References Cited

U.S. PATENT DOCUMENTS

| | | | |
|---|---|---|---|
| 2,773,789 | 12/1956 | Clark | 428/171 |
| 2,786,005 | 3/1957 | Clark | 428/171 |
| 2,817,617 | 12/1957 | Rogers | 428/528 |
| 3,054,706 | 9/1962 | Glaubert | 428/528 |
| 3,164,511 | 6/1965 | Elmendorf | 428/107 |
| 4,122,236 | 10/1978 | Holman | 428/537 |

FOREIGN PATENT DOCUMENTS 966409  4/1975  Canada ............................ 18/166

Primary Examiner—Marion McCamish
Attorney, Agent, or Firm—Bailey, Dority & Flint

[57] ABSTRACT

An artificial lumber board comprises a plurality of elongated wood strips having medial body portions of different thicknesses and tapered tip end portions being thinner and more flexible than the medial portions wherein the wood strips are aligned longitudinally in the board and compressed. The compressed wood strips lap and bend over one another to form generally continuous sinuous wood grain-like structures extending along the board with the tapered tip portions providing generally point contact fitting of the wood strips with one another reducing the presence of void spaces in the board.

19 Claims, 20 Drawing Figures

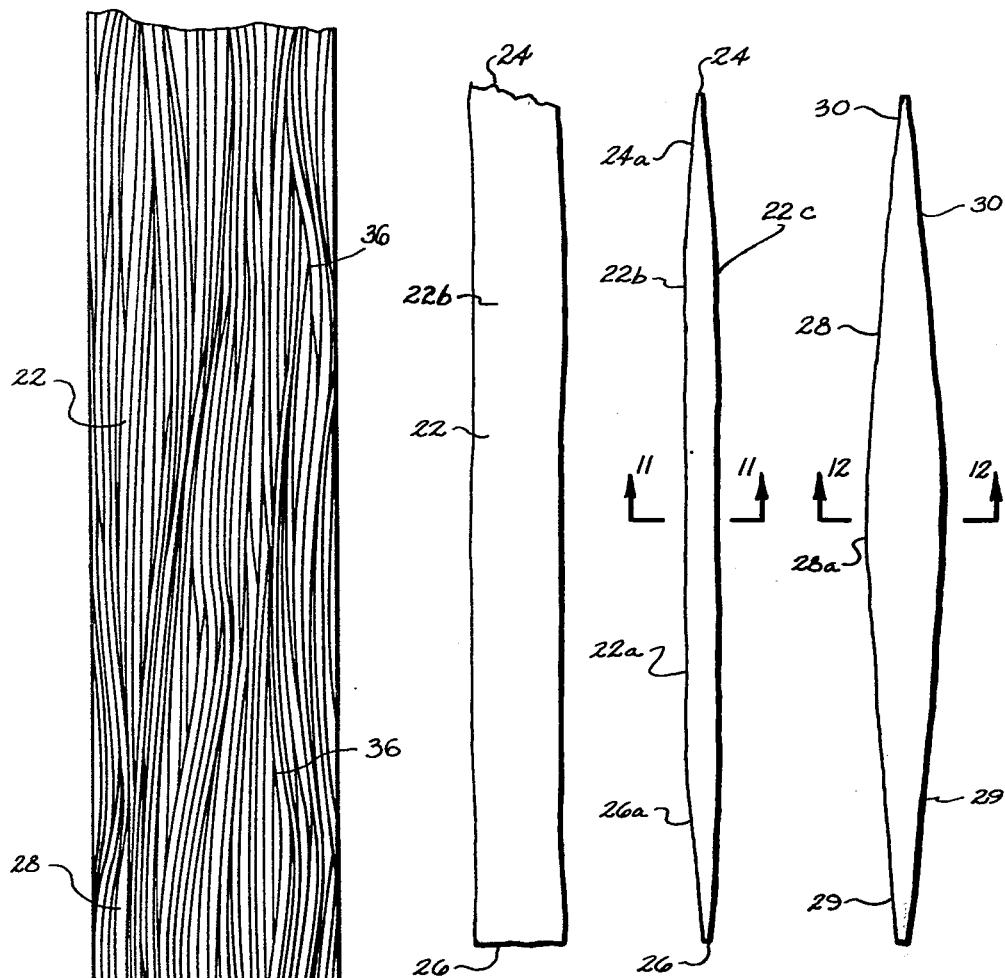
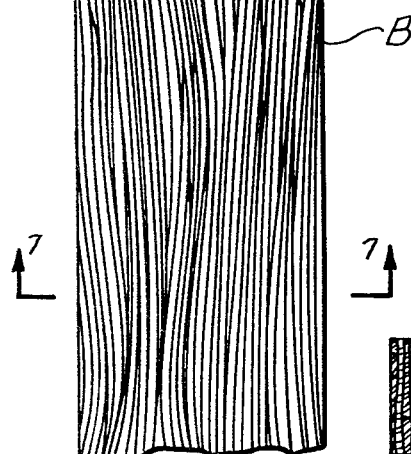
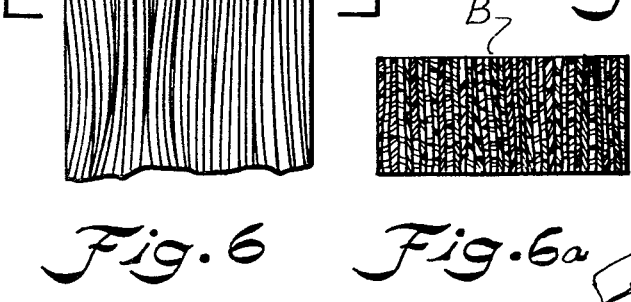
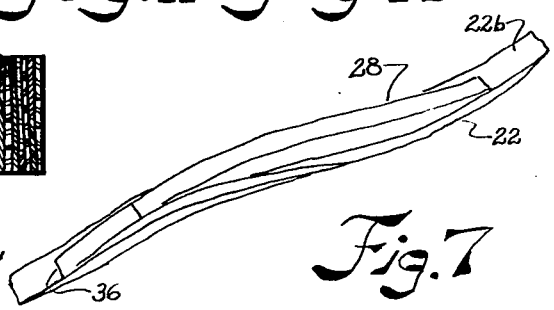
Fig. 6  Fig. 6a  Fig. 7  Fig. 8  Fig. 9  Fig. 10  Fig. 11  Fig. 12

ARTIFICIAL BOARD OF LUMBER

CROSS REFERENCE TO RELATED APPLICATION

This application is a continuation-in-part of a copending application, Ser. No. 795,203, filed May 9, 1977 by the same applicant entitled "Artificial Board of Lumber and Method for Manufacturing Same", now U.S. Pat. No. 4,122,236.

BACKGROUND OF THE INVENTION

The present invention relates to artificial lumber which has a strength greater than or equal to structural grade lumber.

It is well known that artificial boards can be produced by compressing a mixture of wood fibers and adhesive together under temperature and pressure to form pressboard and the like. One problem with such boards is that they are relatively weak in strength.

In an attempt to increase the strength of the board longitudinally extending reinforcing members such as fiberglass have been inserted in the board as disclosed in U.S. Pat. Nos. 3,890,077 and 2,848,733. However, reinforced wood is expensive due to the processing as well as the cost of the reinforcing material itself.

SUMMARY OF THE INVENTION

It has been found that an artificial lumber board having superior strength can be had by providing a plurality of boat-shaped wood strips, each wood strip being elongated defining first and second ends with tapered tip portions formed adjacent each said first and second ends reduced in thickness relative to a medial portion of the wood strip. An adhesive coating is carried by each wood strip and the wood strips are compressed in the artificial board aligned generally longitudinally extending in the board. The tapered tip portions terminate at a substantial point enabling the compressed wood strips to join and fit one another generally at a point contact reducing the presence of void spaces in the artificial board.

Further, by providing wood strips having medial portions which are of different thickness, and tapered tip portions having sufficient flexibility, the wood strips bend over one another when compressed to form generally continuous sinusoidal wood grain structures extending longitudinally in the board which strengthened the board against shear, particularly in the horizontal plane.

In an alternate form, artificial lumber is provided in the form of panels such as plywood sheathing wherein outer layers of the tapered wood strips are provided extending longitudinally in a first direction and a sandwiched center core includes wood strips extending longitudinally in a direction transverse to the outer layer strips.

Accordingly, it is an object of the present invention to provide an artificial board of lumber which is structurally strong and has working characteristics similar to natural lumber.

Another important object of the present invention is to provide artificial lumber in the form of studs, beams, or sheathing such as plywood having a strength comparable to construction wood such as southern yellow pine or Douglas fir.

Still another important object of the present invention is to provide an artificial board of lumber having generally continuous sinusoidal wood grain-like structures extending longitudinally in the board virtually eliminating any horizontal shear plane in the board providing superior strength as a beam.

Yet another important object of the present invention is the provision of artificial lumber formed from compressed wood strips wherein the presence of void spaces between adjacent wood strips is virtually eliminated increasing the structural integrity thereof.

These and other objects and advantages of the invention will become apparent upon reference to the following specification, attendants and drawing.

BRIEF DESCRIPTION OF THE DRAWINGS

FIG. 6 is a side elevation of an artificial lumber board constructed according to the invention, FIG. 6a is an end elevational view of the board of FIG. 6, FIG. 7 is a perspective view illustrating the orientation of compressed strips upon one another in the board of FIG. 6, FIG. 8 is a plan view of a wood strip used to make artificial board according to the invention, FIG. 9 is a side elevation of the wood strip of FIG. 8, FIG. 10 is a side elevation of a wood strip having a plan view similar to that of FIG. 8 but having a thickened medial portion, FIG. 11 is a sectional view taken along line 11—11, FIG. 12 is a sectional view taken along line 12—12.

DESCRIPTION OF A PREFERRED EMBODIMENT

Figure 3:
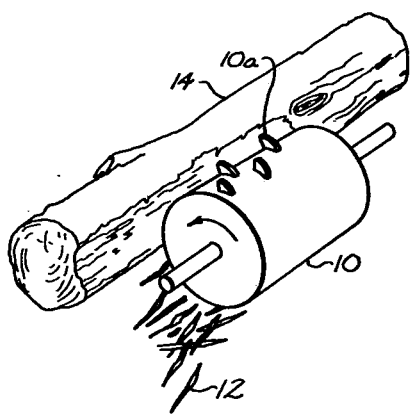
FIG. 3 is a perspective view illustrating a cutting head for cutting wood strips from a log according to the invention.

Referring to FIG. 3 of the drawing, there is illustrated a rotating cutter head 10 of the tree chipper type cutting strips 12 from a pine log 14. It is noted that the cutter head is moving in a direction perpendicular to the grain or length of the log. The strips 12 are irregularly shaped and cut to range from two to eight inches in length. By cutting the splinter strips from the log perpendicular to the length, such causes the splinters to be cut with the fibers thereof being aligned along the length of the splinter.

Figure 1:
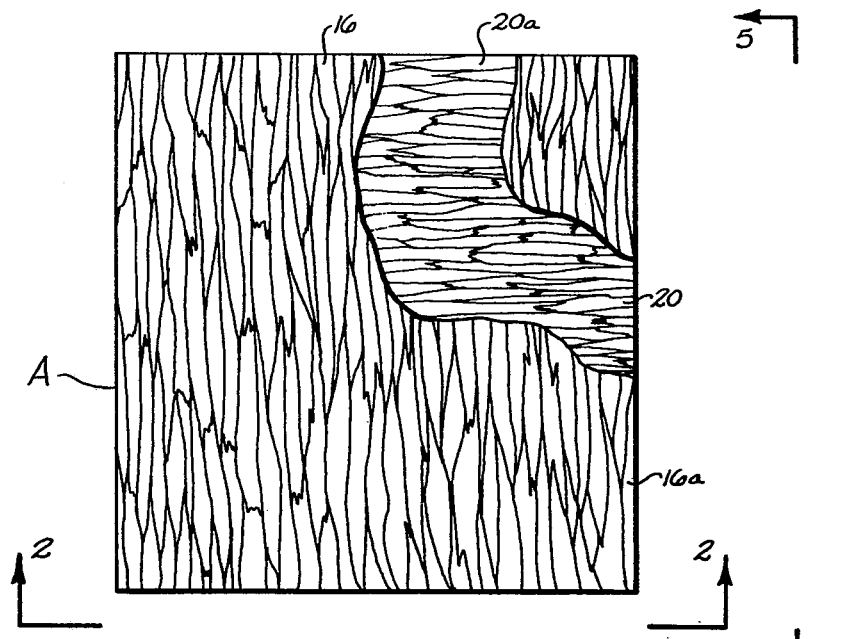
FIG. 1 is a partially cut away plan view illustrating an artificial board panel according to the invention.
Figure 4:
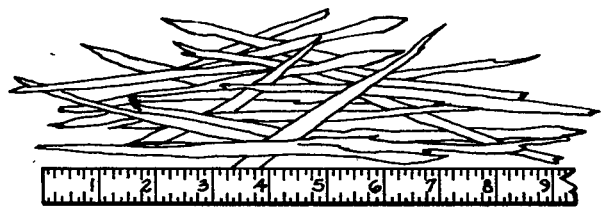
FIG. 4 is a schematic elevation of splinter strips used in the artificial board panel according to the invention.

FIG. 1 illustrates an artificial wood panel A which may be used in the same applications as plywood sheathing. Panel A includes outer layers 16 and 18 and a sandwiched center core 20. FIG. 4 illustrates a typical pile of splinter strips cut from a log for the panel A wherein sixty to seventy percent of the splinters are cut from two to eight inches long and from ⅛ to ½ inch in cross-section all of which may be varied by adjusting the cutting blades 10a in spacing and depth. The remaining thirty to forty percent of the splinters are normally smaller than two inches and may be used as fillers, particularly in the core layer 20, when compressed to form the artificial board.

After the splinters are cut from the log, they are dried to about ten percent moisture and a sealant may be sprayed on the splinters. The splinters are tumbled so as to uniformly coat the splinters with the sealant. In one particular application, a resinous sealer such as phenolic is used for coating the splinters. The sealant may be diluted to enable the solution to be sprayed readily by presently available equipment.

Figure 2:
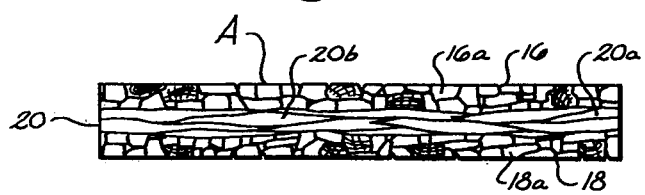
FIG. 2 is an elevation taken along line 2—2 in FIG. 1.
Figure 5:
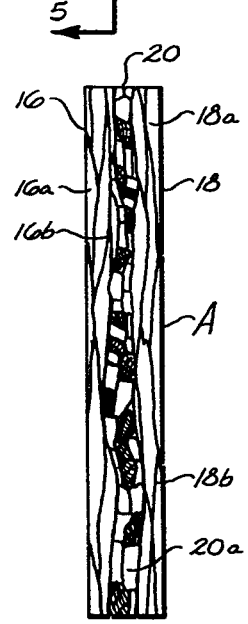
FIG. 5 is an elevation taken along line 5—5 of FIG. 1.

As illustrated, outer layer 16 includes wood strips 16a arranged in longitudinal alignment along one dimension of the panel in one direction. Outer layer 18 includes strips 18a in longitudinal alignment extending in the same direction as strips 16a. Core layer 20a includes strips 20a longitudinally aligned but extending in alignment in a direction transverse to strips 16a and 18a. By tapering the ends of the wood strips to a substantial point, the strips join and fit one another when compressed, such as shown in FIGS. 2 and 5, generally at a point contact to reduce the presence of void spaces in the finished panel which adversely affect the strength thereof. The strips are somewhat tapered by the cutting head 10, however, subsequent processing may be utilized for more uniform and regular taper at the ends. It is noted that the strips are aligned in the panels such that tapered surfaces 16b, 18b, and 20b are uniform in generally facing perpendicular to the direction of compression of their respective layers. To assure such orientation, the splinter strips may be cut to have upper and lower base surfaces widened relative to the thickness making them self-orienting.

An adhesive is applied to the splinters after the sealant has been applied to the splinters, if sealant is desired. If splinters have been sealed, the adhesive adheres to the surface of the splinters rather than penetrating into the wood. Any suitable conventional adhesive and catalyst normally used in making press board can be utilized. Any suitable pressing machine may be utilized such as a conventional press board manufacturing press.

In one particular embodiment, the adhesive is a modified and sulfonated phenol-formaldehyde resin with a curing catalyst. A typical resin in manufactured by Georgia Pacific Corporation and is referred to as GP-5103.

Referring now to FIG. 6 of the drawing, an artificial lumber board is illustrated in the form of a elongated board of lumber such as a standard two by four, two by six, and the like constructional lumber used for studs and beams, the board in FIG. 6 being shown in elevation with a full width and a cut longitudinal section. It is in this form that the invention has particular advantages and compares most favorably with conventional construction lumber. The elongated board of lumber B includes a plurality of boat-shaped wood strips 22 which are relatively regular in shape and are substantially elongated to define first and second spaced ends 24 and 26. In the preferred form of the invention, the wood strips 22 range from six to twelve inches in length. Each wood strip 22 includes a thickened medial main body portion 22a and tapered tip portions 26a and 24a formed adjacent the ends 26 and 24, respectively, which are tapered longitudinally toward the ends. The tapered tip portions being thinner and more flexible than the medial main body portion 22a. The reduced thickness and increased flexibility of the tapered tip portions relative to the medial portion allow the wood strips to bend over one another when compressed in a manner to be more fully hereinafter described.

It will be noted in FIG. 10, that a wood strip 28 is provided similar in plan view to the strip of FIG. 9 having a medial portion 28a of different thickness in that it is thicker than the wood strip of FIG. 9. The wood strip 28 also being provided with double tapered tip portions at 29 and 30. It is desired that the artificial wood board B include a plurality of wood strips of varying thicknesses so that the wood strips will be forced to bend upon themselves when compressed owing to the fact that wood strips of different thicknesses must be accommodated during compression. Thus, a number of generally flat strips such as 22 may be mixed with a number of thicker strips such as 28 as well as with other strips of different thickness at random. Both single taper, one surface flat and one tapered, and double taper, both surfaces tapered, may be utilized. A double taper is preferred since it presents an upper and lower convex curved surface creating more grain curvature in the compressed wood.

FIG. 11 illustrates a cross-section of the wood strip of FIG. 9 wherein the wood strip has a medial portion which is generally flat but of an irregular rectangular cross-sectional shape. FIG. 12 illustrates the cross-section of wood splinter 28 wherein medial portion 28a has a cross-section which may be described as varying from irregularly square or trapazoidal in cross-sectional shape. In the preferred embodiment flat strips 22 may be provided ranging in width from ⅛ to 3 inches and in thickness from 1/32 to ⅜ of an inch. The thicker strips such as 28 may range in thickness from ⅛ to ½ inch and while described as generally square or trapazoidal in cross-section, it is preferred that the width of strip 29 exceed its thickness so that it will orient like strip 22 on its surface of widened dimension and that the width thereof range from ½ to 3 inches also. Strip 29 being described as such only to indicate it is generally thicker than flat strip 22.

Figure 13:
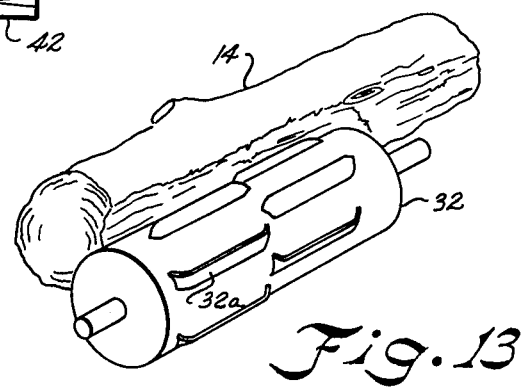
FIG. 13 is a perspective view illustrating a cutting head for cutting wood strips according to the invention.

The wood strips may be formed in any suitable manner such as by utilizing a cutting head shown in FIG. 3 at 10 wherein the length of the splinter may be determined by the lateral adjustment of the cutting blades 10a and the thickness of the splinters may be adjusted by the projection of the blades 10a from the surface of the cylindrical cutting head. If perferred, further processing of the strips may be had in order to provide a more uniform taper at the tapered tip portions. It is important that the ends be of a regular and uniform taper so as to compress upon adjacent wood strips without voids. Alternately, a cutting head such as shown at 32 in FIG. 13 may be utilized which has curved cutting blades 32a carried in staggered relation on the cylindrical cutting head such that the wood chips are more uniformly tapered when cut from the log 14.

Figure 17:
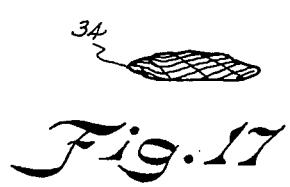
FIG. 17 is an alternate cross-section form of a wood strip according to the invention.
Figure 18:
FIG. 18 is a cross-section of an alternate form of a wood strip according to the invention.

Due to the concavely curved surfaces 32b of the planing blade 32a, boat-shaped wood strips are provided similar in plan and elevational views to those strips shown in FIGS. 8–10. Also, due to the shape of the planing blade 32a, the longitudinal edges of the wood strips are provided with a more pointed edge such as 34 (FIGS. 17 and 18) as opposed to the rather planar edge shown in FIGS. 11 and 12. Such shapes also being referred to and described as generally irregular rectangular and square cross-sections. Edges on the longitudinal side may be desirable in some applications in order that the wood strips join and fit one another on the sides at a contact line rather than bluntly to eliminate the presence of void spaces therebetween which are filled by glue requiring more glue and causing weak spots analogous to knot holes.

The length of the wood chips is determined by the length of the planing blade 32a and the thickness of the wood chips being varied by adjusting the depth at which the planing blade extends from the surface of the cylindrical cutting head. Thus, wood chips of varied thickness may be provided by the same cutting operation by projecting the adjacent cutting blades at different depths from the cylindrical cutting head. It is to be understood, of course, that other cutting tools and methods may be utilized for forming the desired shape of the wood strips according to the invention.

Prior to compressing the wood chips, a suitable adhesive with a curing catalyst such as described previously may be applied to the wood strips. If desired, a sealant may also be applied to the wood strips described previously.

As illustrated, the wood strips are compressed in the artificial board with the tapered tip portioned being tapered to a substantial point enabling the compressed wood strips to join and fit one another generally at a point of lateral contact, such as at 36, reducing the presence of void spaces in the artificial board. It has been found that by this manner, an improved artificial lumber board is provided which eliminates the weaknesses often found in natural lumber such as created by knot holes and the like and which has been found in previous artificial lumber by the creation of glue in void spaces. This manner of joining and fitting adjacent wood strips also enhances the continuity of the sinuous-like grain produced in the compressed board.

The length and tapered tip portions of the wood strips afford sufficient flexibility which enables the wood strips to bend over one another and form generally continuous sinusoidal wood grain-like structures extending longitudinally in the board which greatly strengthen the board against stress by virtually eliminating any horizontal shear planes. Due to the different thicknesses of the wood strips included in the board, the formation of the sinuous wood grain-like structure is enhanced during compression as the wood strips are forced to bend over the adjacent wood strips of different thicknesses accommodating the varying thicknesses during compression. The troublesome problem of horizontal shear in beams of natural lumber is substantially overcome by beams constructed according to the invention. Not only does the sinusoidal wood grain pattern eliminate horizontal shear planes, but it spreads the load out more evenly across the wood.

It is also noted that the wood strips 22 included in the board have generally lateral upper and lower surfaces such as at 22b and 22c widened relative to its thickness and that the taper is formed along this surface at the tapered tip portions 26a and 24a longitudinally toward the ends. The same being true of the upper and lower surfaces of strips 29. The widened surfaces 22b and 22c provide widened base surfaces upon which the strips may be made to orient themselves for compression in the board. This enables the strips to be uniformly oriented and aligned for compression facing a common dimension of the board. For example, FIG. 6 illustrates the widened lateral surfaces facing the side edges or the width dimension of the artificial board B. By uniformly orienting the tapered lateral surface along which the taper is formed in the direction in which the board is compressed, it can be seen that the tapered tip portions are compressed tightly against adjacent wood strips enhancing the elimination of voids and the forming of the sinusoidal wood grain pattern.

In one particular embodiment, the adhesive is a modified and sulfonated phenol-formaldehyde resin with a curing catalyst. A typical resin is manufactured by Georgia Pacific Corporation and is referred to as GP-5103. The following is a typical mixture of wood, adhesive, filler and sealer for making a 1000 board feet of artificial lumber at a density of 40 lb.ft.$^3$ 2270 lbs. of wood strips
103 lbs. of solid phenolic resin
43 lbs. of phenolic resin sealer
20 lbs. of calcium carbonate filler The above is compressed under about 300 psi and cured at 345 degrees Fahrenheit.

The strips may be compressed under pressure on a continuous board producing apparatus such as disclosed in U.S. Pat. No. 3,890,077 or may be pressed under pressure on a conventional press board manufacturing press. Normally, a pressure of 200 to 500 lbs./sq. in. is applied to all sides of the board. Prior to the strips being compressed, they are aligned either manually or mechanically along the desired length of the board.

The widened base surfaces of the strips cause the strips to tend to orient themselves, such as when shaken on a feeding chute, such that the widened tapered surface will perpendicularly and uniformly face the direction of compression. This orientation is desired as it brings about the desired point contact and sinuous grain formation during compression.

After the strips have been compressed into the shape of the desired board, heat is applied to the board for curing the adhesive and locking the strips into position.

The following are tests that were performed on boards commonly referred to as 2×4's which have a cross sectional dimension of 1½ inches ×3½ inches and a length of about 42 inches. The average modulus of elasticity form a number 2 common yellow pine 2×4 being $1.5 \times 10^6$ psi.

1. Board produced from yellow pine wood strips, density 48.14 lb/ft.$^3$ $1.739 \times 10^6$ modular of elasticity 14,400 modulus of rupture 2. Board produced from yellow pine wood strips, density (49.15 lb/ft.$^3$)

$1.597 \times 10^6$ modulus of elasticity 13,600 modulus of rupture

The modulus of elasticity for the various boards as shown above increases with the length of the splinters up to approximately 12 inches.

Figure 14:
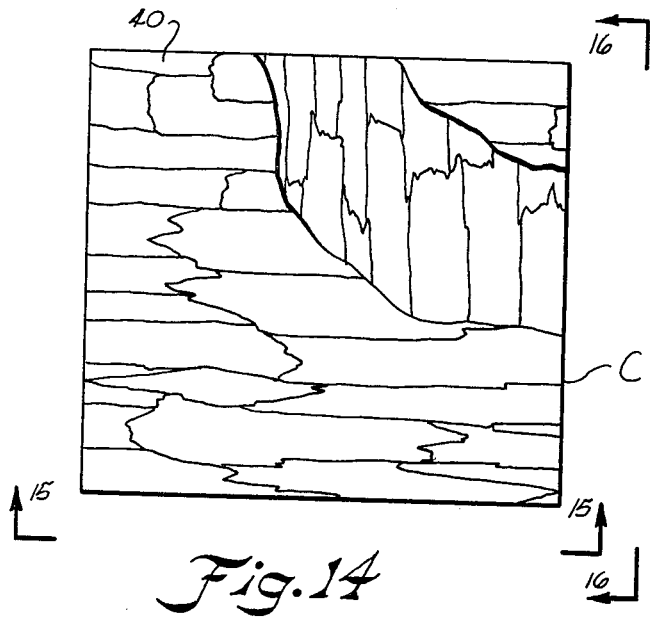
FIG. 14 is a plan view of an artificial board panel constructed from wood strips according to the invention.
Figure 15:
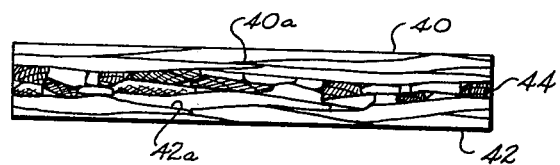
FIG. 15 is an elevational view taken along line 15—15 of FIG. 14.
Figure 16:
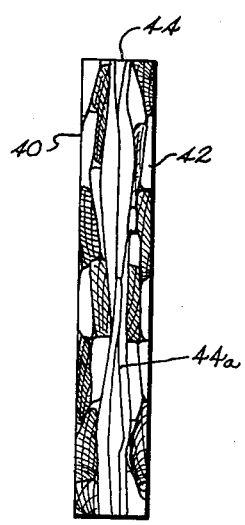
FIG. 16 is an elevation taken along line 16—16 of FIG. 14.
Figure 13A:
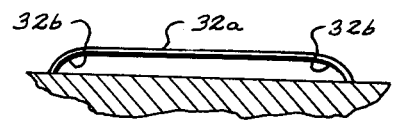
FIG. 13a is a front elevational view of a cutting blade for cutting wood strips according to the invention.

Referring now to FIGS. 14–16, a similar construction will be described for an artificial panel which may be used in applications where conventional plywood sheathing is utilized. The panel C of FIG. 14 also utilizes the elongated boat-shaped wood strips such as shown in FIGS. 8–10 in the following manner. The panel C includes a first outer layer 40 and a second outer layer 42 between which a central core layer 44 is sandwiched. Again, wood strips of from ⅛ to 3 inches in width are utilized with the wider strips being preferred to give a more solid and attractive appearance to the exterior surfaces of the outer layers. The boat-shaped wood strips are also utilized in the central core 44 as well as the outer layers.

Outer layer 40 includes a plurality of the wood strips such as 22 and 28 oriented in a longitudinally extending manner in a first direction. Outer layer 42 includes boat-shaped wood strips aligned in longitudinally in the same direction as layer 40 and core layer 44 includes a plurality of the wood strips aligned longitudinally in a direction transverse to the direction in which the strips of layers 40 and 42 lie. In the alternative, core layer 44 may be formed from shorter splinter strips such as shown in core 20 of FIG. 2 which may include filler strips.

The wood strips are coated with a suitable adhesive and during compression of the three layers, the tapered tip portions being tapered to a substantial point enable the wood strips to join and fit with one another such as at 40a, 42a, and 44a such that formation of void spaces is reduced in the artificial board. The same is true of course for the center core 44 resulting in a much stronger center core and finished structural product. The panel may be pressed in a conventional continuous press machine at a pressure between two hundred psi and five hundred psi. Satisfactory woods are yellow pine, yellow poplar, and young sycamore which have been used to provide panels having structural properties comparable to structural plywood.

Thus, it can be seen that a highly advantageous construction can be had for artificial lumber which compares favorably to the qualities of structural lumber and in some forms such as beams is superior to that of structural lumber. By utilization of boat-shaped wood strips instead of particles and splinters as used heretofore in artificial lumber, an artificial lumber board is provided in which the presence of void spaces between the wood strips is essentially eliminated and in which owing to the shapes of the splinters, a sinusoidal wood grain-like structure is formed in the board along a longitudinal dimension virtually eliminating any possibility of a horizontal shear plane in the board.

While a preferred embodiment of the invention has been described using specific terms, such description is for illustrative purposes only, and it is to be understood that changes and variations may be made without departing from the spirit or scope of the following claims.

What is claimed is:

1. An artificial lumber board comprising:
 a plurality of wood strips;
 each said wood strip being substantially elongated in length to define first and second spaced ends;
 said wood strips having a generally flat configuration including thickened medial portions having a thickness generally less than the width of said wood strip and tapered tip portions reduced in thickness relative to the thickness of said medial portion;
 an adhesive coating carried on each said wood strip;
 said width of wood strips being substantial to define distinct upper and lower lateral sufraces against which said wood strips are uniformly compressed from one face to an opposing face of said artificial board with all of said lateral surfaces being generally perpendicular to the direction of said compression;
 said wood strips extending in general longitudinal alignment in the direction of the longitudinal dimension of said lumber board along the length of said artificial board, said length and taper end portions affording sufficient flexibility enabling said wood strips to bend over one another forming and defining generally continuous sinusoidal wood grain-like structures extending longitudinally throughout said artificial board.

2. The structure of claim 1 wherein said medial portions of said wood strips are of varying thickness forcing said wood strips to bend upon one another when compressed to enhance the formation of said sinusoidal wood grain-like structures.

3. The structure of claim 1 wherein said tapered tip portions are formed at each of said first and second ends and terminate at a substantial point enabling said wood strips to join and fit one another generally at a point contact reducing the formation of voids in said artificial board.

4. The structure of claim 1 wherein said tapered tip portions are provided across said surfaces being tapered longitudinally toward said end, said lateral surface of said tapered surfaces of said wood strip being uniformly aligned facing said dimension of said board generally perpendicular to said direction of compression thereof providing a general point of contact across said lateral surface of said tapered tip portions to reduce the pressure of glue and void spaces.

5. The structure of claim 1 wherein said wood strips range in length from six to twelve inches.

6. The structure of claim 5 wherein said wood strips include a number having medial portions which are generally flat having an irregular rectangular cross-section and a number which have thicker medial portions of generally irregular square cross-section.

7. The structure of claim 5 wherein a number of wood strips include a generally flat medial portion having a thickness of about 1/32 to ⅜ of an inch and a width of about ¼ to 3 inches.

8. The structure of claim 7 wherein a number of said wood strips include a medial portion thickened relative said first said number of strips ranging in thickness from ⅛ to ½ inch.

9. An artificial lumber board comprising:
 a plurality of wood strips;
 each said wood strip being elongated defining first and second ends;
 each said wood strip having a generally flat configuration and a width having a dimension relative to the thickness of said wood strips to define distinct upper and lower lateral surfaces;
 all of said wood strips being oriented from one face to an opposing face in said artificial board with lateral surfaces of overlapping wood strips lying substantially flush against one another and with all of said lateral surfaces being generally perpendicular to the direction of said compression;
 a tapered tip portion formed adjacent each said first and second ends reduced in thickness relative to a thickness of a medial portion of said wood strip;
 an adhesive coating carried by each said wood strip;
 said wood strips being compressed in said artificial board extending with their length being in general longitudinal alignment along a common dimension of said board; and
 said tapered tip portions formed generally across said lateral surfaces and terminating at a substantial point enabling said compressed wood strips to join and fit against one another generally at a point contact across the width thereof reducing the presence of void spaces in said artificial board.

10. The structure of claim 9 wherein said tapered tip portions afford sufficient flexibility enabling said wood strips to bend over one another when compressed to form generally continuous sinusoidal wood grain structures extending longitudinally in said board, and wood strips having medial portions which are of varied thickness enhancing the formation of said sinusoidal wood grain structures.

11. The structure of claim 9 including a pair of spaced outer layers of said compressed wood strips generally longitudinally aligned in a first direction and a core layer sandwiched between said outer layers including said compressed wood strips generally longitudinally aligned in a direction transverse to said first direction.

12. The structure of claim 9 wherein said wood strips range in length from six to twelve inches and in thickness from 1/32 to ½ inches.

13. An artificial board of lumber comprising:
a plurality of generally flat wood strips being substantially elongated in length defining first and second spaced ends and spaced longitudinal sides;
each said wood strip having a substantial width having a dimension relative to the thickness of said sides of said wood strip to well define a pair of distinct widened base surfaces upon said strips are oriented in said board when compressed;
an adhesive coating carried on each said wood strip; and
said wood strips being arranged uniformly with its length in longitudinally extending alignment with the longitudinal dimension of said board of lumber and compressed in said board with said widened lateral surfaces fitting upon one another from one face to an opposing face of said board of lumber generally perpendicular to the direction of compression between said opposing faces; and
said wood strips varying in thickness and partially overlapping and compressed uniformly upon said laterally widened surface of one another to define generally continuous sinusoidal lines of adhesive extending longitudinally simulating a natural wood grain throughout said lumber board.

14. The structure of claim 13 wherein said widened surfaces are tapered longitudinally towards each said end defining tapered tip portions being thinner and more flexible than a medial portion of said wood strip, each said tapered tip portion terminating at a substantial point enabling said wood strips to fit upon one another at a point of lateral contact reducing the presence of void spaces in said artificial board.

15. The structure of claim 13 wherein said wood strips include taper tip portions formed adjacent said first and second ends being thinner and more flexible than a medial portion of said wood strip, said length and tapered tip portion affording sufficient flexibility enabling said wood strips to flex and bend upon one another to form generally continuous wood grain-like structures extending longitudinally in said board.

16. The structure of claim 15 wherein said tapered tip portions terminate at a substantial point enabling said ends of said compressed wood strips to join and fit upon adjacent strips at a general point of lateral contact reducing the presence of void spaces in said artificial board.

17. An artificial lumber board comprising:
a pair of spaced opposed outer layers including a plurality of wood strips being substantially elongated in length defining first and second spaced ends;
each said wood strip having a thickened medial portion and a tapered tip portion formed adjacent each said end being thinner and more flexible than said medial portion;
said wood strips being oriented extending generally longitudinally in a first direction along one of the dimensions of said artificial board;
said wood strips being compressed with said points of said tapered tip portions joining and fitting upon adjacent wood strips to reduce void spaces in said board;
a center core including a plurality of elongated wood strips oriented in longitudinally extending alignment in a direction transverse to said first direction; and
said wood strips being compressed to form a multi-layered panel board.

18. The structure of claim 17 wherein said wood strips of said outer layers range from six to twelve inches in length.

19. The structure of claim 17 wherein said core layer includes a number of fillter wood strips shorter in length than said elongated wood strips.

* * * * *